US009216828B2

(12) United States Patent
Mialhe et al.

(10) Patent No.: US 9,216,828 B2
(45) Date of Patent: Dec. 22, 2015

(54) ATTACHMENT INTERFACE DEVICE FOR ATTACHING MOBILE EQUIPMENT TO AN AIRCRAFT STRUCTURE

(75) Inventors: Christophe Mialhe, Giroussens (FR); Nicolas Grosseau, Frouzins (FR)

(73) Assignee: Airbus Operations S.A.S., Toulouse (FR)

( * ) Notice: Subject to any disclaimer, the term of this patent is extended or adjusted under 35 U.S.C. 154(b) by 1077 days.

(21) Appl. No.: 13/270,643

(22) Filed: Oct. 11, 2011

(65) Prior Publication Data

US 2012/0102719 A1 May 3, 2012

(30) Foreign Application Priority Data

Oct. 12, 2010 (FR) ...................................... 10 58305

(51) Int. Cl.
*B64D 17/60* (2006.01)
(52) U.S. Cl.
CPC ........... *B64D 17/60* (2013.01); *Y10T 29/49826* (2015.01); *Y10T 29/49959* (2015.01)
(58) Field of Classification Search
CPC .......... B23Q 3/06; B23Q 3/066; B23Q 3/186; B23Q 2703/00
See application file for complete search history.

(56) References Cited

U.S. PATENT DOCUMENTS

| | | | |
|---|---|---|---|
| 2,994,497 A | 8/1961 | Hoffacker, Jr. et al. | |
| 5,190,250 A | 3/1993 | DeLong et al. | |
| 6,665,918 B1* | 12/2003 | Williams | 29/259 |
| 6,742,415 B2* | 6/2004 | Scott | 81/15.9 |
| 2005/0044680 A1* | 3/2005 | Terrill et al. | 29/259 |
| 2012/0102719 A1* | 5/2012 | Mialhe et al. | 29/525.08 |
| 2013/0152353 A1* | 6/2013 | Hu | 29/261 |

FOREIGN PATENT DOCUMENTS

FR 2 315 436 1/1977

OTHER PUBLICATIONS

French Preliminary Search Report and Written Opinion issued Jun. 29, 2011, in French 1058305, filed Oct. 12, 2010 (with English Translation of Categories of Cited Documents).

* cited by examiner

*Primary Examiner* — Lee D Wilson
(74) *Attorney, Agent, or Firm* — Oblon, McClelland, Maier & Neustadt, L.L.P.

(57) ABSTRACT

An interface device for attaching mobile equipment (1) to an aircraft structure (5) comprises at least an attachment arm (6) and is subject to traction along a main axis of said equipment.

The interface device comprises at least one fitting (2) secured to the structure (5), the fitting (2) and the attachment arm (6) having attachment means that coordinate together to offset the tensile stress and that comprise:

means to hook a first end of the arm (7) to a first end of the fitting (8),
a locking device (9) that coordinates with the hooking means to lock the first end of the arm (7) to said first end of the fitting (8),
attachment means to attach a second end of the arm (10) to a second end of the fitting (11).

9 Claims, 6 Drawing Sheets

ART ANTERIEUR

ART ANTERIEUR

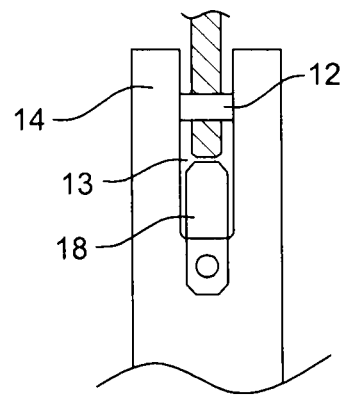
Fig. 5A
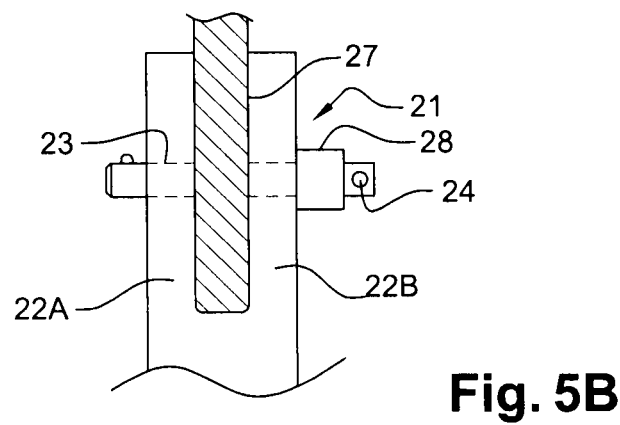
Fig. 5B
Fig. 5

ATTACHMENT INTERFACE DEVICE FOR ATTACHING MOBILE EQUIPMENT TO AN AIRCRAFT STRUCTURE

BACKGROUND

This invention relates to an attachment interface for attaching mobile equipment to an aircraft structure. More specifically, the invention relates to attachment means for attaching a winch system to a structure inside of an airplane to optimize the transmission of stress loading to the structure in three directions in order to prevent any movement of this equipment relative to the structure while allowing for the quick mounting and release of the equipment. The invention also relates to a method for mounting and releasing equipment attached to such an interface and a cable installation for aircraft having such an attachment interface.

Such a cable installation has applications mainly in the field of military aircraft in the context of static line parachuting.

Usually, in the context of static line parachuting, parachutists hook up their static line to an anchor line cable stretched high inside the airplane by means of a snap hook. When a parachutist jumps from a door located at the rear of the airplane, the static line unfurls and pulls the parachute out of his bag. When the parachute is fully deployed, due to gravity, the cord that connects it to the static line becomes taut and breaks with the static line, which then hangs on the line cable.

There is a known installation of such a suspension cable with a winch system (FIG. 1) situated at the front of the airplane and usually paired with a pulley system at the rear of the airplane, the assembly allowing the cable to be stretched from one end of the airplane to the other end and, by winding and unwinding the cable around the rotating drum of the winch, allowing the static lines, which are left hanging from the door after the parachutists jump, to be brought back into the airplane in order to close the door of the airplane.

It is also known that the winch is attached to the structure of the aircraft via four attachment arms 28A, 28B situated at the ends of a frame 26 that each cooperate with a corresponding fitting 2A, 2B. The fitting is a formed part to be permanently attached to the structure of the aircraft.

FIG. 2 provides a front section view of the attachment interface between the attachment arms and the fittings to show the means of attaching the attachment arms to the fittings. Each of the four arms 28A, 28B has a double clevis in which is houses one end 4A, 4B of the fitting 2A, 2B. The sides of the double clevises and the ends are drilled to accommodate a fastener 30, such as a screw and nut, to lock into position all of the elements of the assembly clevises thus formed.

BRIEF SUMMARY

In the context of attaching the winch to the inner structure of the airplane, it has been found that these traditional attachment systems do not optimally respond to many—sometimes conflicting—constraints.

The prior art's attachment system does not allow the stress load exerted on the attachments to efficiently flow toward the structure, causing the attachment areas to be strained, particularly by the tensile stress and compression exerted by all of the load applied to the attachment interface between the structure and the equipment.

A winch for the intended application typically weighs about 25 kg, and to attach it using the attachment interface from the prior art, it is necessary to support the winch while trying to line up the bores in the attachment arms relative to the bores in the fittings, and then to insert the fasteners. For operators, mounting and releasing the winch takes as lot of time, and such operations may be lengthy.

However, it is necessary to be able to remove one or more winches to be able to use the airplane for other missions, such as for transporting equipment and troops, to save room in the airplane, and to avoid transporting the unnecessary load of the mass of the winches. Also, as part of a mission, it is essential to be able to quickly mount and release the winch(es), and it is generally desirable for the time required to mount or release a winch to not exceed a given amount of time (ex. 15 min).

In addition, in the context of multiple parachutes, the suspension cable installation must support a relatively significant load both at the moment when the parachutists jump and also at the end of the drop operations, when all of the static lines hanging from the door of the airplane exert a relatively significant load on the cable installation. It is therefore essential for the winch attachment system to include a safety device that is intended to prevent any risk of tearing down the winch under the effect of the weight, including the failure of one of the connections between the winch and the structure, without introducing a weakness to the assembly.

Finally, it is crucial for such an attachment system to withstand the load associated with normal and exceptional accelerations that may occur during use of the airplane and the vibrating environment of the airplane, with the parts that comprise the attachment system having to hold the winch still to prevent it its parts from coming unclamped as a result of the vibrations. Such an unclamping could lead to a detachment of the attachment arms.

This invention provides a highly reliable attachment interface for equipment like a winch, subjected to traction during use, on the structure of an airplane, that can meet the requirements describes above without altering the structure or the frame holding the equipment, having attachment means with improved designs and procedures for quickly releasing and mounting the equipment, without excess size or cost.

For this, the invention provides an attachment interface that combines hooking means with traditional assembly means. The hooking means can improve the operations of mounting the equipment, which consists of first hooking the ends of two attachment arms to the fittings, an operation that does not require high accuracy and that relieves the operator from having to bear the weight of the equipment, and then attaching the other connections.

Advantageously, this new interface includes a locking device to lock the ends and to prevent movement in the fittings that are capable of occurring as a result of vibrations or the tensile stress exerted on the equipment.

By tensile stress exerted on the equipment, this means for example the stress resulting from the load suspended on the opposite end of the cable from a winch and the traction that can be exerted on the cable.

This attachment interface allows for an assembly that prevents any relative movement between the assembled parts, and it does not require any special tools.

To this end, the invention relates to an attachment interface for mobile equipment on an aircraft structure, said equipment comprising at least one attachment arm and being subjected to traction directed along a main axis of said equipment.

According to the invention, this interface includes at least one fitting, said fitting being secured to said structure, said fitting and the attachment arm having attachment means that coordinate together to offset the tensile stress.

In various embodiments of this attachment interface, each having its particular advantages and allowing numerous possible technical combinations, the attachment means comprise:

- hooking means to hook a first end of the arm to a first end of the fitting,
- a locking device that coordinates with said hooking means to lock said first end of the arm to said first end of the fitting,
- attachment means to attach a second end of the arm to a second end of the fitting.

The device in the invention advantageously comprises the following characteristics in its technically operating combinations:

- the hooking means comprise a first U-shaped double clevis traversed by a pin located either on the first end of the fitting or on the end of the arm, and a corresponding hook-shaped part located on the first end or on the end of the fitting, said pin and said corresponding hook coordinating together to hook the first end of the arm to the first end of the fitting;
- the locking device comprises at least one wedge element inserted between a bottom of the first U-shaped double clevis and the hook, the wedge element being capable of being positioned with an adjustment system at a first position, called the unclamped position, in which the wedge element does not have a surface pressing on the hook, the pin being in this free position in the groove of the hook and at a second position, called the clamped position, in which the wedge element has a surface pressing on the hook, the first end of the arm in this position being unmovable with respect to the first end of the fitting;
- the wedge element comprises a first essentially flat surface that closely follows the bottom of the first U-shaped double clevis and a second surface, opposite the first, having a shape that coordinates with the shape of the hook so as to form a stop position for the wedge element in the clamped position;
- the adjustment system comprises a cylindrical rod at one end of a head to which the wedge element is attached, the rod traversing a hole opening to the first end of the arm, the rod being secured to a locking element placed at the other end of the cylindrical rod at the opening of the hole, the locking element causing the cylindrical rod to be adjusted by screwing into the clamped position;
- the rod comprises a threading at its end associated with the locking element, and the locking element comprises a tapped hole with complementary threading to the threading of the rod, its adapted shape thereby allowing clamping and unclamping by hand;
- the attachment means comprise a second U-shaped double clevis located at the second end of the fitting or on the second end of the arm and a single clevis on the second end of the arm or on the second end of the fitting, the sides of the second double clevis each comprising a first bore and the single clevis comprising a second bore, the single clevis being placed in the double clevis such that the second bore and the first bores are aligned and traversed by a fastener;
- the fastener comprises a rod with a locking means translating in the traversed bores;
- the fastener is a tool-free quick release pin whose one rod has a locking ball for locking in translation in the traversed bores, allowing for easy tool-free handling;
- the attachment interface comprises two attachment arms secured to a frame of a winch with a rotating shaft, each attached to a corresponding fitting.

The invention also relates to a method of mounting equipment to an aircraft structure by means of such an attachment interface.

The invention also relates to a cable installation inside an aircraft, said installation having at least a winch for controlling the winding and unwinding of at least one cable around a rotating drum, the winding and unwinding of the cable transporting the load suspended on the cable, in which the frame supporting the winch is attached to a structure of the aircraft by means of such an attachment device.

BRIEF DESCRIPTION OF THE DRAWINGS

The invention will be described in more detail with reference to the accompanying drawings, in which:

FIG. 5A schematically shows a top view of an assembly between a first end with a U-shaped double clevis and a first hook-shaped end, and FIG. 5B shows a top view of an assembly between the two second ends;

DETAILED DESCRIPTION

Figure 1:
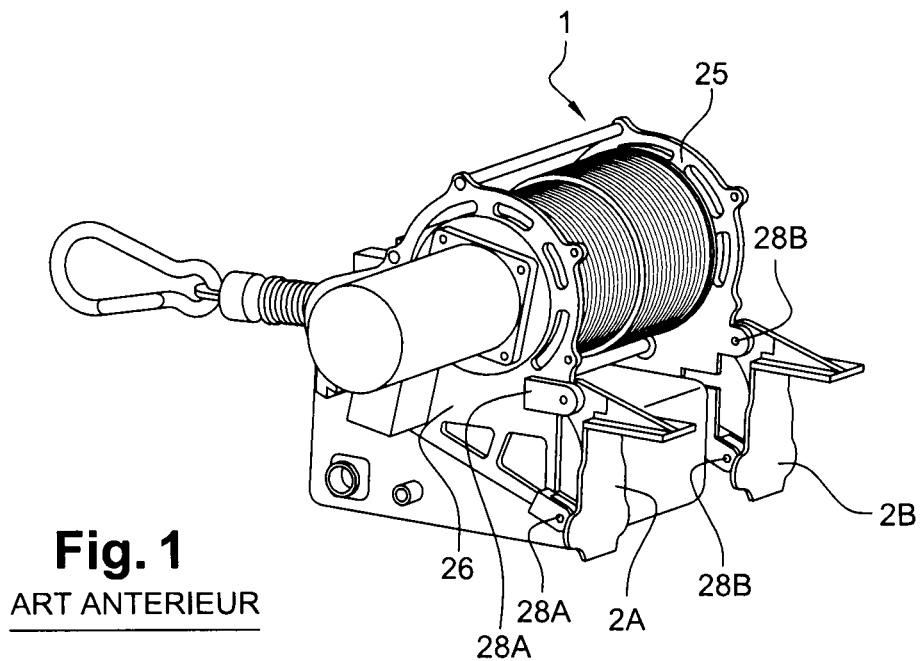
FIG. 1 is a schematic representation of a winch with an attachment interface of the prior art.
Figure 2:
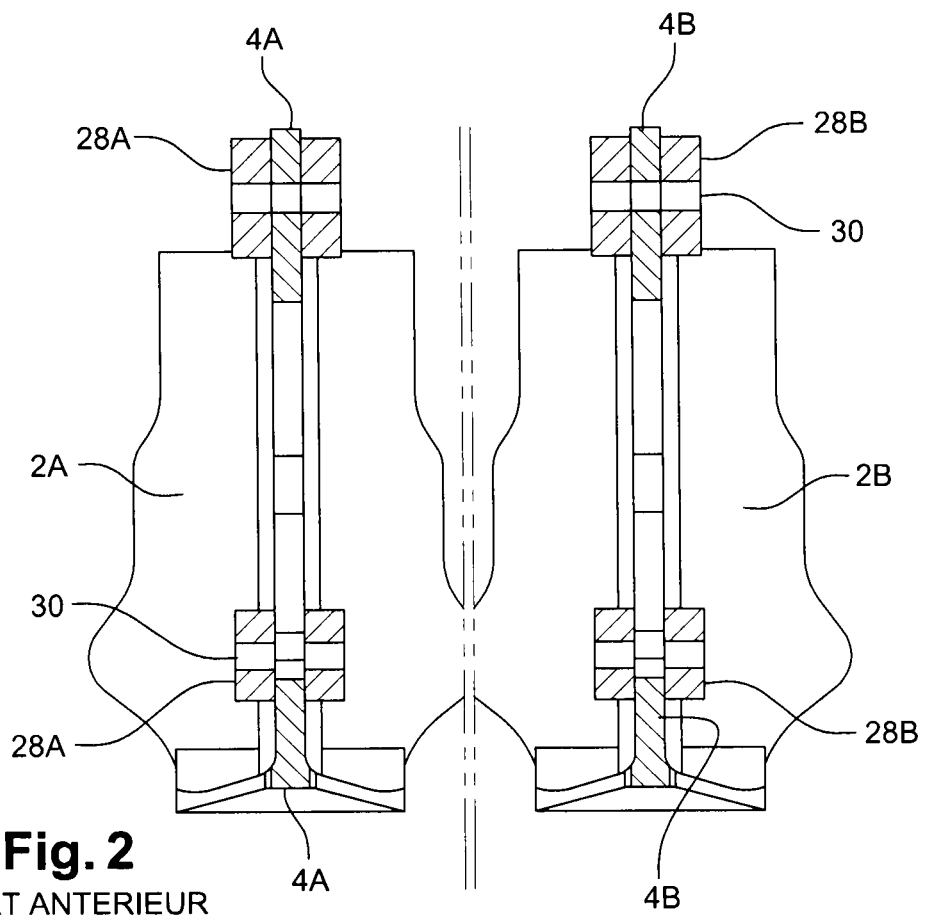
FIG. 2 is a front section view of FIG. 1 of the attachment interface between the attachment arms of the frame and the fittings.
Figure 3:
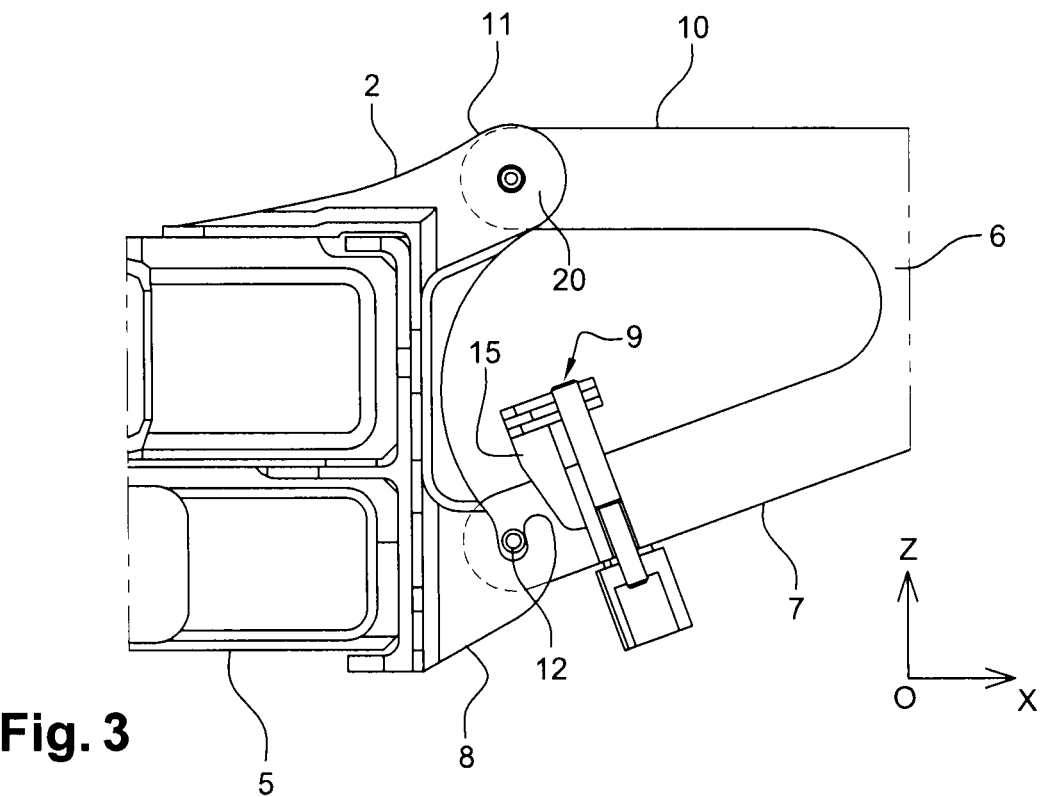
FIG. 3 is a section view of an attachment interface between an attachment arm and the ends of a fitting according to a particular embodiment of the invention, in which the locking device for the hooking means is in an unclamped position.

FIG. 3 shows an attachment interface for mobile equipment 1 on an aircraft structure 5 according to an example embodiment of the invention. The equipment here comprises an attachment arm 6 that is subject to traction in an opposite direction to the attachments from the equipment to the structure in a direction X. The attachment arms 6 comprise a first end 7 and a second end 10 that coordinate with a first end 8 and a second end 11 of a fitting 2, the fitting being permanently secured to the structure 5.

According to the invention, the fitting 2 and the attachment arm 6 comprise hooking means that coordinate with a locking device to remove the mounting clearances.

In the example illustrated in FIG. 3, the hooking means comprise on the first end of the arm 7 a part of a first U-shaped double clevis 13 and a pin 12 traversing said double clevis on said first end of the arm and a hooked-shape section 14 located on the first end of the fitting 8 that coordinates with the first end of the arm. The first end of the arm 7 is hooked onto the first end of the fitting 8 by inserting the pin 12 into a groove of the hook 14. FIG. 5A shows a top view of such a connection between the two first ends 7, 8.

In another example embodiment, the hooking means are reversed, placing the first U-shaped double clevis on the fitting and the hook on the attachment arm.

To lock the movement of the pin 12 in the groove of the hook, a groove whose width is clearly greater than the diameter of the pin 12 for easier insertion of said pin into said groove when mounting the equipment, the interface also comprises a locking device 9 that coordinates with the hooking means to prohibit the pin 12 from moving into the groove in the direction of the X-axis.

The locking device 9 comprises a wedge element 15 inserted between a bottom of the first U-shaped double clevis and the hook 14. This wedge element 15 is capable of being positioned by means of an adjustment system 16 at a first position, called the unclamped position, in which there is no surface pressing on the hook 14, the pin 12 being consequently free in the groove of the hook 14, and the first end of the arm 7 is not locked relative to the first end of the fitting 2.

Figure 4:
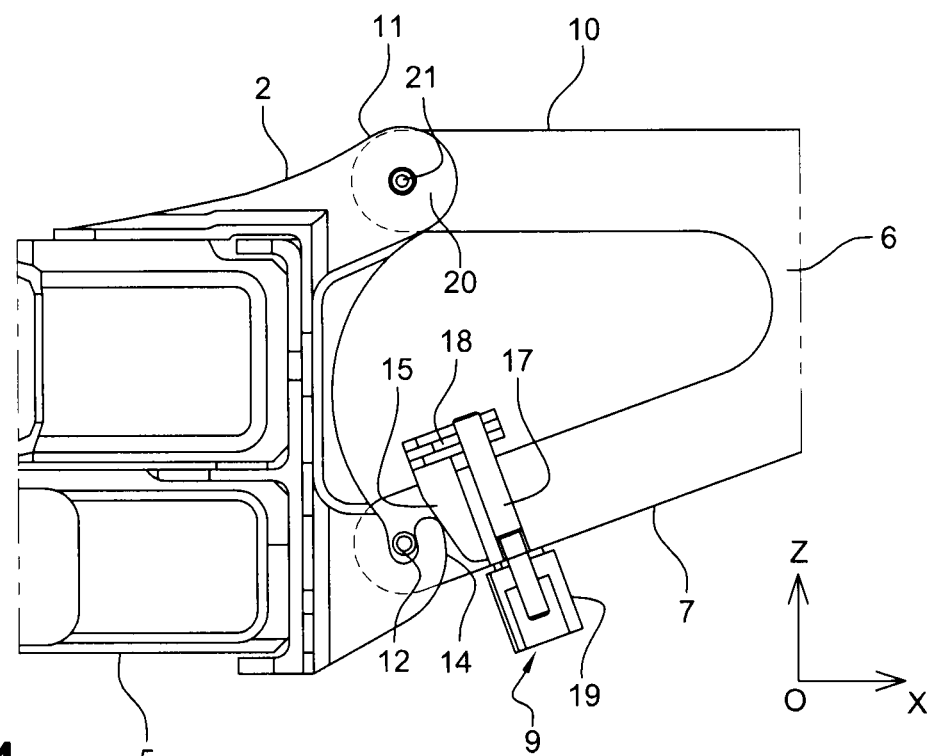
FIG. 4 is a representation of FIG. 3 in which the locking device is in a clamped position.

FIG. 4 shows the locking device 9 positioned in a position, called the clamped position, in which the wedge element 15 has a surface pressing on a portion of the surface of the hook 14 so as to immobilize the first end of the arm 7 on the first end of the fitting 8.

Advantageously, this wedge element 15 comprises an essentially flat surface capable of sliding on an essentially flat bottom of the U-shaped double clevis 13 and the surface opposite of the first on the wedge having a shape that coordinates with the shape of the hook 14 so as for form a stop position when moving the wedge element to its clamped position.

Preferably, the wedge element 15 has a corner shape whose one section becomes smaller in the direction of its movement toward its clamped position.

The adjustment system 16 that allows the wedge element to move between the two positions includes a cylindrical rod 17 with a head 18 on one end, the rod having a part in a through hole placed on the first end and locked by means of a locking element 19 placed at the other end of the rod from the side with the exit opening of the hole. The tightening effect introduces a translation movement along an axis of the rod 17. One end of the wedge element is connected to a head 18 such that the tightening effect on the rod causes the wedge element 15 to move from the unclamped position to its clamped position.

Preferably, the rod 17 has a threading on at least one portion of its surface, and the locking element 19, whose shape allows it to be driven by hand, includes a tapped hole with threading that is complementary to the threading on the rod so as to allow continuous and reversible tightening.

FIG. 3 also describes attachment means for attaching the second end of the attachment arm 10 to the second end of the fitting 11. A top view of the connection between the two second ends is provided in FIG. 5B, showing a second U-shaped double clevis 27 located on the second end of the arm 10, which receives a single clevis 20 from the second end of the fitting 11. Sides 22A, 22B of the second housing 27 each include a first bore, and the clevis has a second bore, said bores being arranged such that, when the clevises are positioned to be assembled, the bores are aligned so as to allow a fastener 21 to pass through.

This fastener 21 typically comprises a rod 23 with a diameter that is adjusted to the bores of the clevises and a head 28 that may or may not be flush, along with a locking means translated in the bores. Advantageously, the head is provided with a gripping means to be able to manually place the fastener 21 and to allow the assembly of the sides 22A, 22B of the double clevis and the single clevis 20 so as to create a tight radial connection.

Such a fastener is, for example, made by a pin having a threaded end coordinating with a nut and a tapping on a section of the double clevis 20.

Advantageously, the fastener is a quick-lock pin that is inserted or removed from the bores without tools and that, when positioned, comprises locking means, usually a ball protruding from said pin, which prohibits said quick-lock pin from leaving the bores without being unlocked from the side of the head by an operator.

The distance between the axis of the bores of the clevis 20 of the fitting 2 and the bottom of the groove of the hook 14 is such that the pin 12 of the first double clevis on the first end of the arm 7 is located above the bottom of said groove, without contact with said bottom, when the second end of the arm 10 is attached to the clevis 20 by the fastener 21.

This arrangement guarantees that the mounting is achieved without the arm 6 being constrained between its first and second end 7, 10 and without the placement of the fastener 21 requiring special effort.

FIGS. 6 to 10 show the various steps for mounting an example of equipment on a structure 5. In this example, the mobile equipment, not shown, comprises two attachment arms 6A, 6B designed to be each attached to a corresponding fitting 2A, 2B.

Such equipment comprising two attachment arms can be used to attach, for example, a winch with a rotating drum to a structure inside of an airplane. As illustrated, the most common position used in airplanes for such a winch has a substantially horizontal axis in an airplane frame of the axis of rotation of the drum of the winch.

Such a cable installation inside of an aircraft is designed to suspend, for example, static lines for parachutes, typically comprising a winch and two cables whose winding and unwinding around the rotating drum helps to move the load suspended on the cable, for example, to bring back the static lines hung near the door at the rear of the plane after parachutists have jumped in order to be able to close the door.

Preferably, all of the elements of the attachment interface according to the invention are made using one or more selected materials that meet the requirements of the aerospace industry in terms of their elastic deformation and mechanical properties. By preference, the selected material is of the group which includes steel, stainless steel, aluminum, or even composite materials with an organic matrix containing organic or inorganic fibers.

Figure 6:
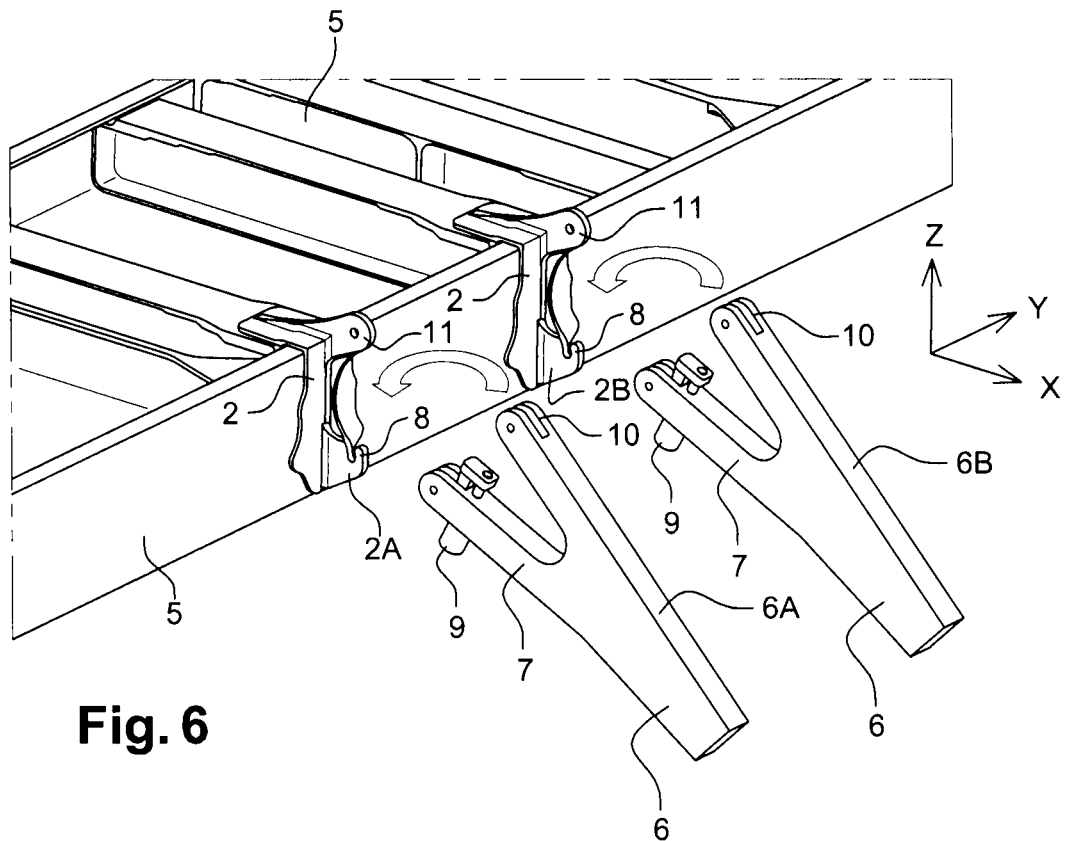
FIGS. 6, 7, 8, 9, and 10 show the successive steps in the method of mounting a winch to the structure using an example of an embodiment of an attachment interface according to the invention.

FIG. 6 shows a first step of the method of mounting equipment comprising two attachment arms 6A, 6B to the aircraft structure 5 by means of an attachment interface according to the invention, in which the locking devices 9 located on the first ends of the arm 7 are unscrewed by moving the clevis element 15 to the unclamped position and the first ends of the arm 7 are hooked on the corresponding first ends of the fittings 8, a hooking movement symbolized by arrows in the figure.

In general, when the winch has a weight that exceeds 25 kg, this first mounting step requires two operators. The oversized width of the grooves of the hooks relative to the pins of the first ends of the arms 7 needing to be placed in said grooves makes it easy to insert said pins into the grooves without special tools.

Figure 7:
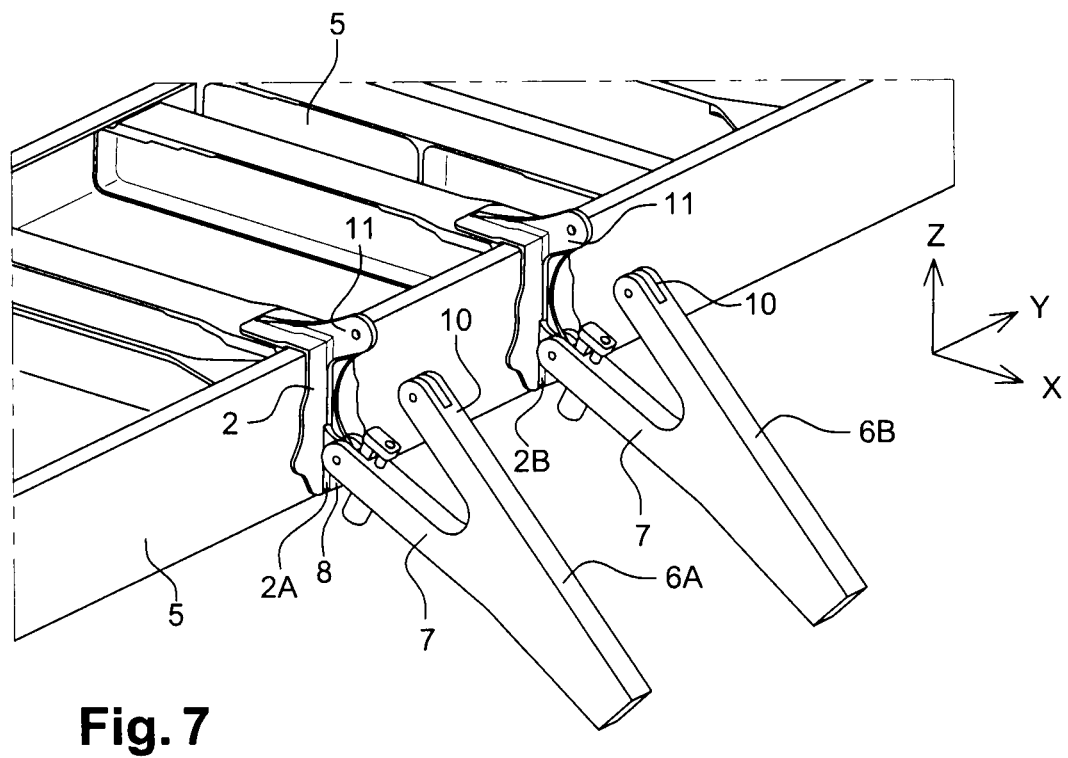

FIG. 7 shows an intermediate step in which the two attachment arms 6A, 6B are suspended on the first ends of the two fittings 2A, 2B, the arms being then free to rotate around the Y-axis.

In this position, the weight of the equipment is supported by the hooks 8, the pins 12 of the first ends of the arms 7 being pressed on the bottom of the grooves.

Figure 8:
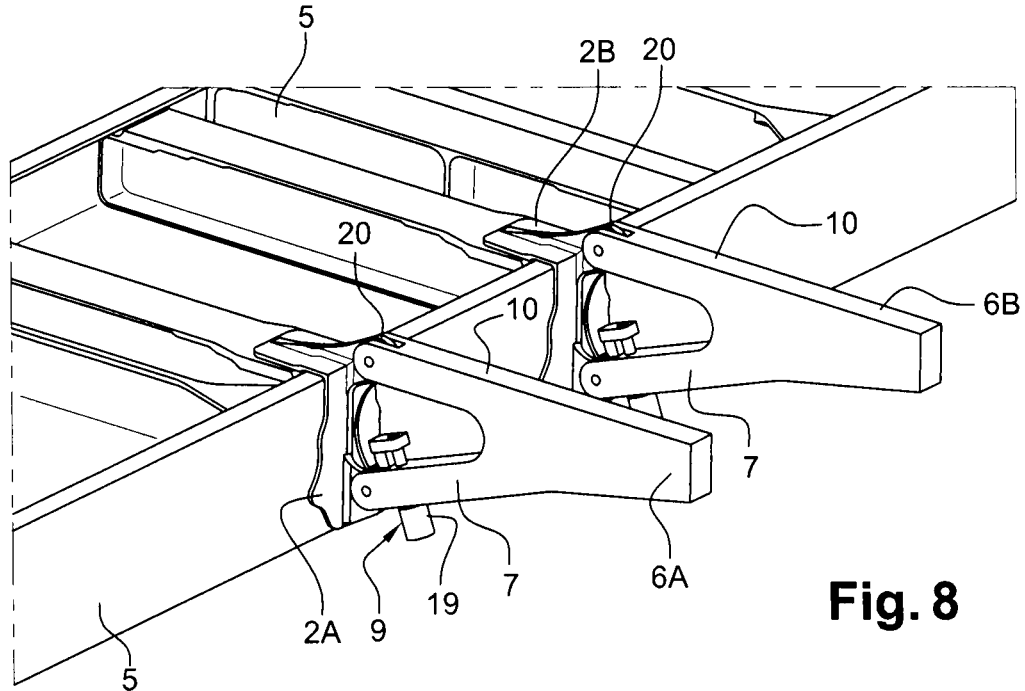

FIG. 8 shows a second step in which the single clevises 20, located on the two ends of the fitting 11, are placed in the corresponding second U-shaped double clevises located on the two ends of the arms 10 such that the bores of the single clevises are centered on those of the sides of the double clevises. This second step is achieved by a first movement to rotate the equipment around the pins 12 of the first ends of the arms 7 pressing on the bottoms of the grooves of the hooks 8, followed by an adjustment of the height of said pins in said grooves to obtain the desired centering.

Figure 9:
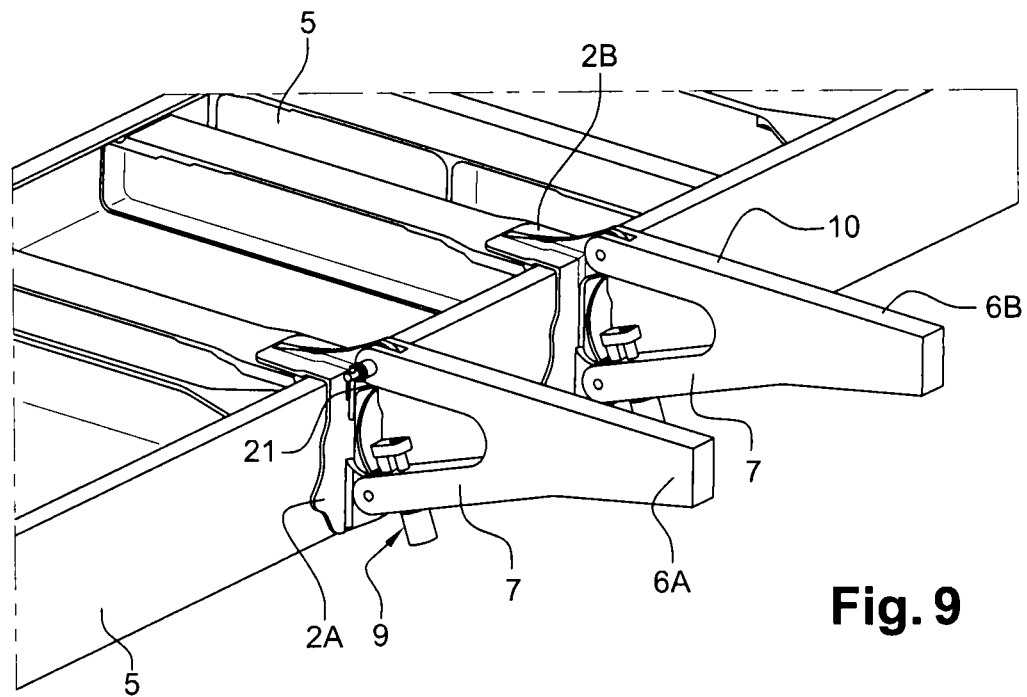
Figure 10:
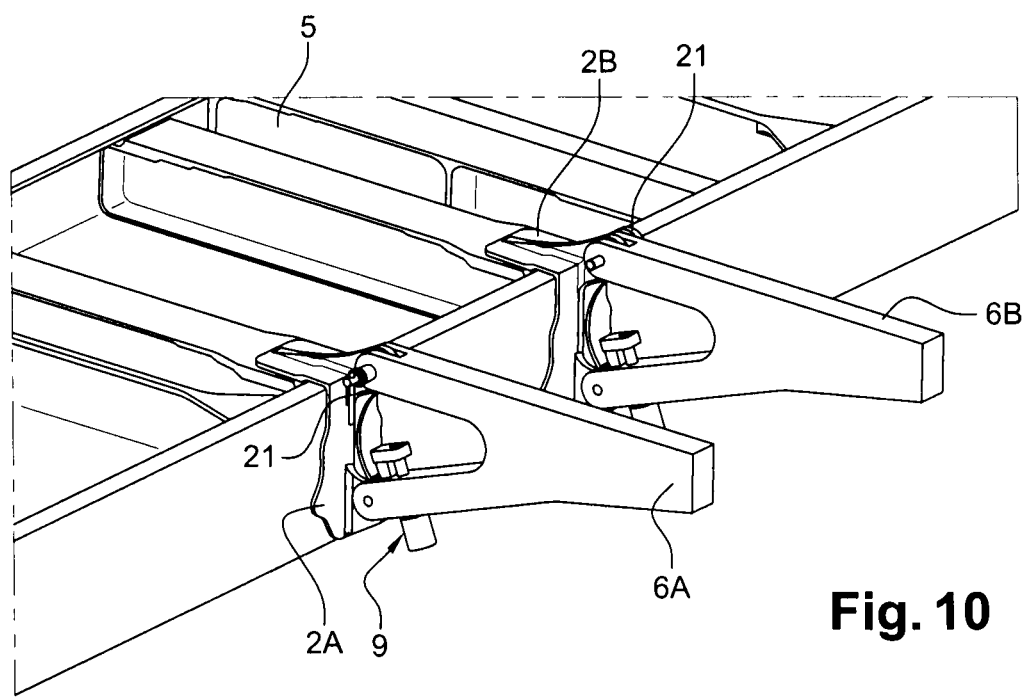

FIGS. 9 and 10 show the steps in which the fasteners 21 are inserted into the bores to attach the second ends 10 of the two attachment arms 6A, 6B to the two ends 11 of the two corresponding fittings 2A, 2B so as to achieve an assembly in which the translation movements along the X- and Z-axes are removed.

In a third step, the locking device 9 is placed in clamped position, which is obtained by screwing the fastener 19 to move the wedge element 15 to the clamped position so as to immobilize the first end of the arm 7 relative to the fitting 8.

The equipment is then attached to the structure of the airplane, immobilized in rotation and translation relative to the X-, Y-, and Z-axes and transmitting stress both in the preferred direction of the traction, essentially corresponding to the direction X, and according to the forces of inertia of the equipment resulting from accelerations and vibrations in the three directions.

The invention claimed is:

1. An attachment interface device for mobile equipment on an aircraft structure, said equipment having at least one attachment arm and being subject to traction along a main axis of said equipment, said interface device comprising at least one fitting being secured to said structure, said fitting and the attachment arm having attachment means that coordinate together to offset the tensile stress, wherein said attachment means comprise:
    hook devices to hook a first end of the arm to a first end of the fitting,
    a locking device that coordinates with said hood devices to lock said first end of the arm to said first end of the fitting, and
    attachment devices to attach a second end of the arm to a second end of the fitting,
    wherein said hook devices comprise a first U-shaped double clevis traversed by a pin located either on the first end of the fitting or on the first end of the arm, and a corresponding hook located on the first end of the arm or on the first end of the fitting, said pin and said corresponding hook coordinating together to hook the first end of the arm to the first end of the fitting.

2. An attachment interface device according to claim 1, wherein said locking device comprises at least one wedge element inserted between a bottom of the first U-shaped double clevis and the hook, said wedge element being capable of being positioned with an adjustment system at an unclamped position in which the wedge element does not have a surface pressing on the hook, said pin being in this unclamped position in a groove of the hook and positioned at a clamped position in which the wedge element has a surface pressing on the hook, the first end of the arm in this clamped position being unmovable with respect to the first end of the fitting.

3. An attachment interface device according to claim 2, wherein the wedge element comprises a first essentially flat surface that closely follows the bottom of the first U-shaped double clevis and a second surface, opposite the first, having a shape that coordinates with the shape of the hook so as to form a stop position for the wedge element in the clamped position.

4. An attachment interface device according to claim 2, wherein said adjustment system comprises a cylindrical rod at one end of a head to which the wedge element is attached, said rod traversing a through hole of the first end of the arm, said rod being secured to a locking element placed at another end of the cylindrical rod at the opening of the hole, the locking element causing the cylindrical rod to be adjusted by screwing.

5. An attachment interface device according to claim 4, wherein the rod comprises a threading at its end associated with the locking element and said locking element comprises a tapped hole with complementary threading to the threading of the rod.

6. An attachment interface device according to claim 1, wherein said attachment device comprises a second U-shaped double clevis located at the second end of the fitting or on the second end of the arm and a single clevis on the second end of the arm or on the second end of the fitting, sides of said second double clevis each comprising a first bore and said single clevis comprising a second bore, said single clevis being placed in said double clevis such that said second bore and said first bores are aligned and traversed by a fastener.

7. An attachment interface device according to claim 6, wherein said fastener comprises a rod with a locking device that translates in the traversed bores.

8. An attachment interface device according to claim 7, wherein said fastener is a tool-free quick release pin whose rod has a locking ball for locking in translation in the traversed bores.

9. An attachment interface device according to claim 1, comprising two attachment arms secured to a frame of a winch with a rotating shaft, each attached to a corresponding fitting.

* * * * *